United States Patent [19]

Schilling

[11] Patent Number: 5,391,636
[45] Date of Patent: Feb. 21, 1995

[54] POLYAMINE CONDENSATES OF STYRENE-MALEIC ANHYDRIDE COPOLYMERS AS CORROSION INHIBITORS

[75] Inventor: Peter Schilling, Charleston, S.C.

[73] Assignee: Westvaco Corporation, New York, N.Y.

[21] Appl. No.: 91,862

[22] Filed: Jul. 14, 1993

Related U.S. Application Data

[63] Continuation-in-part of Ser. No. 15,928, Feb. 10, 1993, abandoned.

[51] Int. Cl.⁶ .......................... C08F 8/30; C23F 11/14
[52] U.S. Cl. .......................... 525/381; 252/389.32; 252/390; 252/394; 525/375; 525/379; 525/380; 525/382; 525/386; 507/939
[58] Field of Search .......... 252/390, 389.32, 8.555, 252/394; 525/380, 382, 381

[56] References Cited

U.S. PATENT DOCUMENTS

| | | |
|---|---|---|
| 3,134,759 | 5/1964 | Kirkpatrick .......................... 530/231 |
| 3,412,024 | 11/1968 | Stanford . |
| 3,494,891 | 2/1970 | McWhorter et al. . |
| 3,549,532 | 12/1970 | Stanford et al. . |
| 3,647,731 | 3/1972 | Clough . |
| 3,766,113 | 10/1973 | Strand et al. . |
| 3,941,808 | 3/1976 | Pratt ..................................... 525/379 |
| 4,010,111 | 3/1977 | Chappell et al. . |
| 4,233,193 | 11/1980 | Hochreuter et al. . |
| 4,374,737 | 2/1983 | Larson et al. . |
| 4,446,260 | 5/1984 | Woods et al. . |
| 4,526,813 | 7/1985 | Wu . |
| 4,623,680 | 11/1986 | Azarnia et al. . |
| 4,658,036 | 4/1987 | Schilling . |
| 4,743,388 | 5/1988 | Lege . |
| 4,927,669 | 5/1990 | Knox et al. . |
| 5,053,151 | 10/1991 | Chung et al. . |
| 5,208,319 | 5/1993 | Schilling . |

Primary Examiner—Fred Zitomer
Attorney, Agent, or Firm—Daniel B. Reece, IV; Terry B. McDaniel; Richard L. Schmalz

[57] ABSTRACT

Corrosion inhibiting compositions for metals subjected to highly acidic environments may be produced by reacting in a condensation reaction a styrene-maleic anhydride copolymer with a polyamine (or combination of polyamines) to produce a polyimidoamine inhibitor. A preferred inhibitor product may be produced by replacing up to 80% of the styrene-maleic anhydride copolymer with a member selected from the group consisting of: rosin, $C_{23}$–$C_{24}$ modified rosins, $C_8$–$C_{20}$ fatty acids, $C_9$–$C_{22}$ modified fatty acids, and combinations thereof. These inhibitors exhibit excellent film forming and film persistency characteristics.

8 Claims, No Drawings

POLYAMINE CONDENSATES OF STYRENE-MALEIC ANHYDRIDE COPOLYMERS AS CORROSION INHIBITORS

This application is a continuation-in-part of my commonly assigned U.S. patent application Ser. No. 08/015,928, filed Feb. 10, 1993, now abandoned entitled "Polyamine Condensates of Styrene-Acrylic Acid and Styrene-Maleic Anhydride Copolymers as Corrosion Inhibitors."

FIELD OF THE INVENTION

This invention relates to compositions which inhibit the corrosion of metals. More particularly, this invention relates to compositions which inhibit the corrosive effect of acids on metals and the process for producing the same.

BACKGROUND OF THE INVENTION

Corrosion may be defined as the gradual destruction of a material, usually by means of a chemical process. Inorganic or organic chemicals which prevent or slow-down the rate of destruction are called inhibitors. As corrosion may occur under a variety of environmental conditions, different inhibitors have been developed to provide protection for particular situations.

A number of industrial processes (e.g., dissolving of mineral incrustations and acidizing of oil wells) involve the application of hydrochloric or other acids having the capacity to corrode metal surfaces. It is common, therefore, to employ organic film forming compositions during such applications to inhibit corrosion. These film forming inhibitors function to coat the metallic pipe surfaces, usually via the adsorption of molecular polar groups.

It is the object of this invention to provide an effective corrosion inhibitor exhibiting superior film-forming characteristics under highly acidic environments.

SUMMARY OF THE INVENTION

The object of this invention is met by reacting a styrene-maleic anhydride copolymer in a condensation reaction with a polyamine (or combination of polyamines) to produce a polyimidoamine inhibitor product. A preferred inhibitor product may be produced by replacing up to 80% of the styrene-maleic anhydride copolymer with a member selected from the group consisting of: rosin, $C_{23}$–$C_{24}$ modified rosins, $C_8$–$C_{20}$ fatty acids, $C_9$–$C_{22}$ modified fatty acids, and combinations thereof.

The corrosion inhibiting effects produced by these products are primarily due to the ability of fatty amines, amidoamines, and imidazolines to form films on metal surfaces. The polymeric nature of these products coupled with the high number of amino-anchoring groups contained in their molecules permit these inhibitors to form protective films exhibiting excellent persistencies on metal surfaces exposed to highly acidic environments. As used herein, the term "highly acidic environments" describe environments having a pH of 1 or less, and also solutions having a mineral acid concentration of 1–35%.

DESCRIPTION OF THE PREFERRED EMBODIMENT

The process for producing the corrosion inhibitor first reacts in a polymerization reaction styrene and maleic anhydride to form a styrene-maleic anhydride copolymer. This copolymer is subsequently reacted in a condensation reaction with a polyamine (or combination of polyamines) to form a polyimidoamine corrosion inhibitor. These reactions and the inhibitor reaction product are represented in FIG. 1 below.

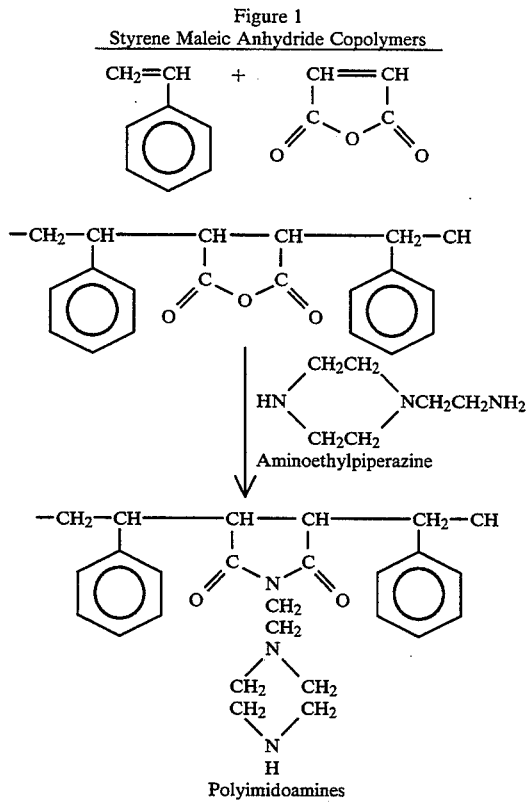

Figure 1
Styrene Maleic Anhydride Copolymers

The ratio of styrene to maleic anhydride required to yield the desired styrene-maleic anhydride copolymers ranges from about 1:1 to 3:1. These copolymers are produced by heating in the presence of a suitable radical initiator and a suitable solvent the desired mixture of styrene and maleic anhydride to a temperature in the range of about 85°–270° C. for a time sufficient for the polymerization reaction to occur (commonly about 1 to 20 minutes). (This reaction is described in U.S. Pat. No. 3,766,133 to Strand et al., which is hereby incorporated by reference). Styrene-maleic anhydride copolymers suitable for use in the invention have molecular weights in the range of about 400 to 5,000. The half-esters of these copolymers can also be utilized.

The ratio of styrene-maleic anhydride copolymer to polyamine required to produce the desired polyimidoamine inhibitor ranges from about 1:1 to 2.5:1. This inhibitor is obtained by heating the desired mixture of styrene-maleic anhydride copolymer and polyamine to a temperature in the range of about 180°–240° C. for a time sufficient for the condensation reaction to occur (commonly about 16 to 24 hours). The presence of a high boiling solvent such as diethylene glycol or dipropylene glycol is beneficial to the reaction.

Preferred inhibitors may be produced by replacing up to 80% of the styrene-maleic anhydride copolymer with a member selected from the group consisting of rosin (i.e. resin acid), $C_{23}$–$C_{24}$ modified rosins, $C_8$–$C_{20}$ fatty acids, $C_9$–$C_{22}$ modified fatty acids, and combinations thereof. Fatty acids which are suitable for the practice of this invention have molecular weights in the range of about 200–350. Sources of such suitable fatty acids include various animal and vegetable oils, glycerides, and tall oil fatty acids. The term "tall oil fatty acid" refers generally to the class of products containing 90% or more fatty acids which are obtained by fractionation of crude tall oil. The fatty acids are primarily a mixture of oleic and linoleic acids, with small amounts of saturated and other unsaturated fatty acids. Common impurities include rosin and neutral materials. Tall oil fatty acids suitable for the practice of this invention are readily obtainable from commercial sources, an example being the tall oil fatty acid sold by the Westvaco Corporation under the designation L-5.

Modified $C_8$–$C_{22}$ fatty acids suitable for the practice of this invention have molecular weights in the range of about 270–470 and are produced by reacting in a Diels-Alder reaction polyunsaturated fatty acids (such as linoleic acid) with fumaric acid, maleic anhydride, itaconic acid, methacrylic acid, or acrylic acid to produce cyclic polycarboxylic acids. (This Diels-Alder reaction is described in the commonly assigned, allowed U.S. patent application Ser. No. 07/712,717 now U.S. Pat. No. 5,194,640 to Cosgrove et al., which is hereby incorporated by reference).

Rosin suitable for the practice of this invention have molecular weights in the range of about 300–350 and include wood rosin, gum rosin, and tall oil rosin. Modified $C_{23}$–$C_{24}$ rosins suitable for the practice of this invention have molecular weights in the range of about 270–470 and are produced by reacting in a Diels-Alder reaction rosin with fumaric acid, maleic anhydride, itaconic acid, methacrylic acid, or acrylic acid to produce cyclic polycarboxylic acids. (This Diels-Alder reaction is described in the commonly assigned, allowed U.S. patent application Ser. No. 07/904,218 now U.S. Pat. No. 5,208,319 to Schilling, which is hereby incorporated by reference).

Polyamines which are suitable for use in the invention have a molecular weight in the range of 60–1,000, and include any amine capable of forming an imidoamine when reacted with a copolymer. These include, but are not limited to, the following: aminoethylethanolamine, aminoethylpiperazine, diethylenetriamine, triethylenetetramine, tetraethylenepentamine, bis-aminopropylamine, pentamethylenediamine, hydroxyethyl-piperazine, bis-hexamethylene triamine and higher molecular weight homologies.

The polyamine employed in the practice of this invention may be a mixture of the compounds described above. Examples of such polyamine mixtures which are commercially available include AMINE HH (a polyamine blend manufactured by Union Carbide, Inc.) and BHMT (a polyamine blend sold by DuPont, Inc.). AMINE HH is composed of the following major ingredients:

- aminoethylpiperazine: 55.1–63.0%
- triethylenetetramine: 25.8–35.8%
- aminoethylethanolamine: 5.6–9.3%
- diethylenetriamine: 5.1–6.9%
- hydroxyethylpiperazine: 1.3–3.1%

BHMT is a mixture of polyamines taken from bis-hexamethylene triamine bottoms and contains 20–60% bis-hexamethylene triamine.

Radical initiators which are suitable for use in the above polymerization reactions include heat sensitive organic peroxide and azo compounds, and the like.

For application purposes it is preferred to produce corrosion inhibitors which are liquid in form. Therefore, it may be necessary to adjust the viscosity of certain inhibitor formulations by the addition of a solvent (a process well within the ability of a skilled artisan). Solvents which are suitable for this purpose include, but are not limited to, the following: ethylene glycol, diethylene glycol, polyethylene glycol, propylene glycol, and combinations thereof.

The following examples are provided to further illustrate the present invention and are not to be construed as limiting the invention in any manner.

EXAMPLE 1

A polyimidoamine corrosion inhibitor was produced via the following method. To a clean 2 L three-necked flask equipped with a stirrer, thermometer, and reflux condenser with a Dean Stark trap was charged 1.0 parts by weight of AMINE HH and 1.0 parts by weight of diethylene glycol at room temperature. To this flask 0.5 parts by weight of SMA-1000 (a styrene-maleic anhydride copolymer manufactured by Elf Aquitaine, Inc.) was slowly added (with stirring). The mixture was heated at 240°–250° C. for sixteen hours before being allowed to cool. The resulting polyimidoamine corrosion inhibiting product is hereafter referred to as CI #1.

EXAMPLE 2

A series of corrosion inhibitors were produced via the method taught in Example 1 above. The respective weight ratios of ingredients are listed in Table I below.

Corrosion tests were conducted to evaluate the various inhibitors using mild steel (1010) coupons obtained from the Q-Panel company of Cleveland, Ohio. The weight of each coupon was about 12.5 grams and the surface area was approximately seven square inches (0.1″×3″×1″).

In eight-ounce glass bottles with screw caps, 0.1–0.8 g of corrosion inhibitor was dissolved in 200 ml of 15% hydrochloric acid. Weighed mild steel coupons were inserted into the acid and removed from time to time to determine the weight loss. The relative weight loss (%) can be calculated as:

$$\frac{W_o - W}{W_o} \times 100$$

The corrosion rate expressed in lbs/ft$_2$ can be calculated as:

$$(W_o - W) \times 0.03524$$

An untreated steel coupon was utilized as a control. The test results are listed in Table I below.

TABLE I

Evaluation of Corrosion Inhibitors with 1010 Steel in 15% Hydrochloric Acid at 25° C.
Dosage: 0.1–0.8 g/200 ml

| Corrosion Inhibitor* | % Weight Loss After | | | | | Dosage, g |
|---|---|---|---|---|---|---|
| | 9 days | 18 days | 37 days | 60 days | 160 days | |
| Control | 16.3 | 37.3 | 87.6 | — | — | 0 |
| CI #1 SMA-1000-AMINE HH-DEG (0.5:1:1) | — | — | — | 19.0 | — | 0.8 |
| CI #2 SMA-2000-AMINE HH-DEG | — | — | — | 18.5 | — | 0.8 |

TABLE I-continued

Evaluation of Corrosion Inhibitors with 1010 Steel
in 15% Hydrochloric Acid at 25° C.
Dosage: 0.1–0.8 g/200 ml

| Corrosion Inhibitor* | % Weight Loss After | | | | | Dosage, g |
|---|---|---|---|---|---|---|
| | 9 days | 18 days | 37 days | 60 days | 160 days | |
| (0.5:1:1) CI #3 SMA-3000-AMINE HH-DEG (0.5:1:1) | — | 8.5 | 12.6 | 17.6 | — | 0.8 |

*AMINE HH: a polyamine blend manufactured by Union Carbide, Inc.
DEG: diethylene glycol
SMA-1000, -2000, -3000: styrene-maleic anhydride copolymer manufactured by Elf Aquitaine, Inc.

As Table I shows, the best performance was obtained with AMINE HH condensates of SMA-3000 (the most hydrophobic styrene-maleic anhydride copolymer of this series) which contains three parts styrene and one part maleic anhydride in the initial reactant mix. After 37 days exposure, the weight loss of the steel coupon treated with this formulation was 12.6%; while the untreated control coupon loss 87.6% of its weight over the same period of time.

The AMINE HH condensates with styrene-maleic anhydride copolymers required the use of solvent (i.e., diethylene glycol) due to the tendency of the initial reaction step to form a insoluble viscous precipitate. This precipitate dissolved after 12 to 14 hours reaction time leaving a clear solution of the polyimidoamines.

EXAMPLE 3

A preferred polyimidoamine corrosion inhibitor may be produced via the following method. To a clean 2 L three-necked flask equipped with a stirrer, thermometer, and reflux condenser with a Dean Stark trap is charged 1.0 part by weight of AMINE HH and 1.2 parts by weight of L-5 (a tall oil fatty acid mixture containing less than 5% rosin sold by Westvaco, Inc.). This addition occurs at room temperature and results in an exothermic reaction. As soon as the temperature reaches 100°–120° C., 0.5 parts by weight of SMA-1000 (a styrene-maleic anhydride copolymer manufactured by Elf Aquitaine, Inc.) is slowly added (with stirring) to the flask. The mixture is heated at 240°–250° C. for six hours before being allowed to cool.

Although in the above examples the various corrosion inhibitors were formulated for (and tested in) highly acidic environments, it should be noted that these inhibitors will also prevent corrosion when utilized in other, less strenuous, environments. Indeed, many modifications and variations of the present invention will be apparent to one of ordinary skill in the art in light of the above teaching. It is understood therefore that the scope of the invention is not to be limited by the foregoing description but rather is to be defined by the claims appended hereto.

What is claimed is:

1. A composition for inhibiting the corrosion of metals in highly acidic environments comprising the polyimidoamine reaction product of:
   (a) 1–99 wt. % of styrene reacted in a polymerization reaction with 1–99 wt. % of a maleic anhydride to produce a copolymer; and
   (b) 4–79 wt. % of said copolymer, and 1–64 wt. % of a member selected from the group consisting of rosin, $C_{23}$–$C_{24}$ modified rosins, $C_8$–$C_{20}$ fatty acids, $C_9$–$C_{22}$ modified fatty acids, and combinations thereof, reacted in a condensation reaction with 20–80 wt. % of a polyamine to produce said polyimidoamine reaction product.

2. The composition of claim 1 comprising the polyimidoamine reaction product of:
   (a) 20–80 wt. % of styrene reacted in a polymerization reaction with 20–80 wt. % of maleic anhydride to produce a copolymer; and
   (b) 6–69 wt. % of said copolymer, and 1–56 wt. % of a member selected from the group consisting of rosin, $C_{23}$–$C_{24}$ modified rosins, $C_8$–$C_{20}$ fatty acids, $C_9$–$C_{22}$ modified fatty acids, and combinations thereof, reacted in a condensation reaction with 30–70 wt. % of a polyamine to produce said polyimidoamine reaction product.

3. The composition of claim 2 wherein the polyamine is selected from the group consisting of aminoethylethanolamine, aminoethylpiperazine, diethylenetriamine, triethylenetetramine, tetraethylenepentamine, bisaminopropylamine, pentamethylenediamine, hydroxyethylpiperazine, bis-hexamethylene triamine and higher molecular weight homologs, and combinations thereof.

4. The composition of claim 1 wherein the fatty acid has a molecular weight in the range of 200–350.

5. The composition of claim 1 wherein the modified fatty acid has a molecular weight in the range of 270–470.

6. The composition of claim 1 wherein the rosin has a molecular weight in the range of 300–350.

7. The composition of claim 1 wherein the modified rosin has a molecular weight in the range of 370–470.

8. The composition of claim 2 dispersed in a solvent selected from the group consisting of ethylene glycol, diethylene glycol, polyethylene glycol, propylene glycol, and combinations thereof.

* * * * *